US00RE34784E

United States Patent [19]

Vinas

[11] E Patent Number: Re. 34,784

[45] Reissued Date of Patent: Nov. 15, 1994

[54] METHOD AND APPARATUS FOR THE DRY TREATMENT OF A FABRIC

[76] Inventor: Jaime A. Vinas, Barcelona 23, La Llagosta 08120 (Province of Barcelona), Spain

[21] Appl. No.: 103,880

[22] Filed: Aug. 4, 1993

Related U.S. Patent Documents

Reissue of:

[64] Patent No.: 4,679,333
Issued: Jul. 14, 1987
Appl. No.: 796,605
Filed: Nov. 8, 1985

U.S. Applications:

[63] Continuation-in-part of Ser. No. 696,751, Jan. 31, 1985, abandoned.

[30] Foreign Application Priority Data

May 11, 1984 [ES] Spain ..... 532408

[51] Int. Cl.[5] ..... F26B 13/12

[52] U.S. Cl. ..... 34/629; 34/640; 34/191; 34/633; 68/5 D

[58] Field of Search ..... 34/629, 640, 645, 652, 34/191, 633, 639; 68/20, 5 C, 5 D, 5 E

[56] References Cited

U.S. PATENT DOCUMENTS 4,322,957 4/1982 Nowicki et al. ..... 68/20
4,365,424 12/1982 Hoersch ..... 34/156
4,468,937 9/1984 Bertoldi ..... 68/20

*Primary Examiner*—Denise L. Gromada
*Attorney, Agent, or Firm*—McGlew and Tuttle

[57] ABSTRACT

An apparatus for the dry treatment of a fabric in which an open width fabric is caused to move alternately between an inlet pile and an outlet pile through a duct in which there are currents of air of an appropriate temperature causing the said alternate movements. The fabric is supplied gradually to the inlet pile and is gradually withdrawn from the outlet pile. The apparatus comprises chambers for the said piles and blower and heating means for the air currents.

7 Claims, 1 Drawing Sheet

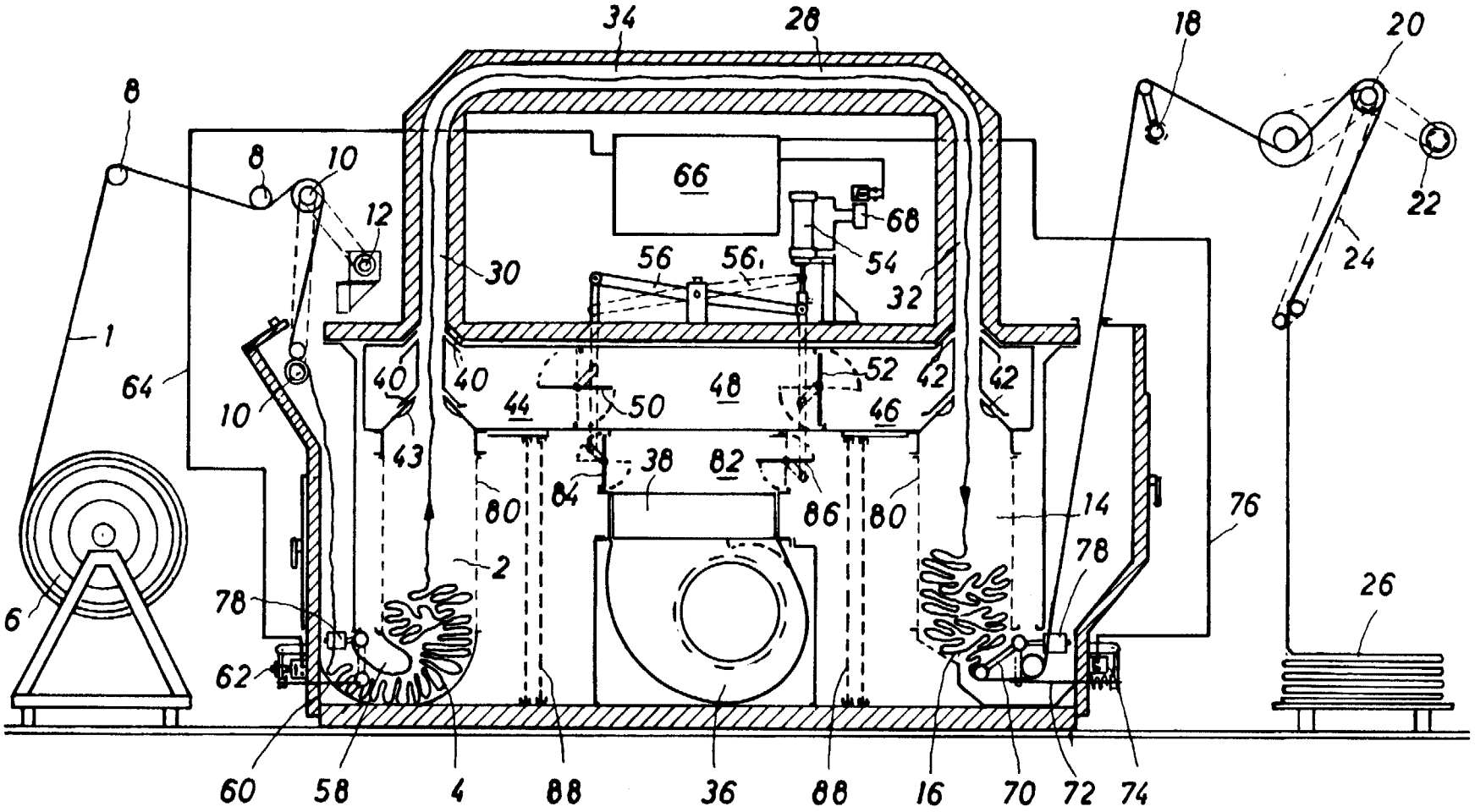
20
22
24
26
18
76
74
14
78
72
70
16
42
42
32
68
54
52
46
80
88
28
86
56
66
48
82
36
56
38
34
50
84
88
44
80
2
30
40
4
40
43
12
10
58
8
10
78
62
60
64
8
1
6

METHOD AND APPARATUS FOR THE DRY TREATMENT OF A FABRIC

Matter enclosed in heavy brackets [ ] appears in the original patent but forms no part of this reissue specification; matter printed in italics indicates the additions made by reissue.

*This application is a Continuation-In-Part of the United States Patent application for a Method and Apparatus for the dry treatment of a fabric, Ser. No. 06/696,751, filed Jan. 31, 1985, now abandoned.*

The invention relates to an apparatus for the dry treatment of an open width fabric, particularly for drying and/or finishing the fabric, and which is applicable to all fabrics, such as cotton, woollen, man-made fibre, blended, knitted and other fabrics.

Hithertofore, the drying and/or finishing operations were performed with the known flat stenter frame, storied stenter frame, batch tumbler, continuous tumbler, contact drum drier, perforated drum drier, sanforising machine, bag drier, roller drier with zig-zag cloth passage and roller guided fabric drier systems, among others.

The apparatus of the invention comprises first and second chambers adapted to contain respective piles of open width fabric, said first chamber being for an inlet pile and said second chamber for an outlet pile; means for providing gradual supply of the fabric into said first chamber; means for providing a gradual removal of the fabric from said second chamber; a flat sectioned duct for containing the open width fabric and which connects said first and second chambers; movable means situated at least partly in each chamber, adapted to be moved by the fabric on exhaustion of the respective pile; blower means for blowing air into said duct and transporting the fabric contained therein; heating elements for said air; slot means in each of the ends of said duct for allowing the ingress of air into the duct; gate means adapted to regulate alternately the direction of air flow towards one or the other slot means; drive means for said gate means, closing one of said gate means while opening the other of said gate means; and connecting means associating the movement of said movable means with said drive means.

A preferred embodiment of the apparatus of the invention is illustrated schematically in the FIGURE.

As shown in the FIGURE, the apparatus comprises a first inlet chamber 2 for an open width fabric 1 which may form an open width fabric inlet pile 4. Outwardly of the apparatus, the fabric is disposed, for example, in a roll 6 from which the fabric is gradually drawn into said pile by way of guide rollers 8 and drive rolls 10 driven by motor 12.

Opposite said chamber 2, there is a second outlet chamber 14 in which an outlet pile 16 may be formed and from which the fabric 1 may be withdrawn gradually by guide rollers 18 and haul off rollers 20 driven in turn by a motor 22. A mechanism 24 suitably arranges the treated fabric 1, forming for example, a folded pile 26.

The two chambers 2, 14 are connected by way of a flat section duct 28 adapted to contain the open width fabric. The duct 28 preferably is arcuate and comprises two substantially vertically disposed end portions 30, 32 and an upper central portion 34.

The apparatus also comprises blower means 36 adapted to blow air into said duct 28, as well as heating elements 38 for said air. In turn, each end portion of the 30, 32 of the duct 28 is provided with a transverse slot means 40, 42, inclined relative to the duct 28, allowing ingress of the air towards the two sides of the fabric, without causing turbulence.

In the portion of the chambers converging to communicate with the start of the duct 28, there arc provided arcuate plates 43 preventing the fabric during the movement thereof from encountering sharp edges. The slot means 40 communicate with a branch 44, while the slot means 42 communicate with a branch 46 and both branches may communicate with a space 48, to where the air moved by the blower means 36 is supplied.

Between the space 48 and the branches 44 and 46 there are provided respectively gate means 50 and 52, adapted to establish or break communication between the space and the branches, such that when one gate means is open the other is closed.

The said gate means are operated by drive means comprising a cylinder and piston mechanism 54 adapted to reciprocate a rocker arm 56, 56' having opposite portions, each of which is mechanically connected with one of the gate means 50 and 52. In the position illustrated in full lines in the figure, the piston of mechanism 54 is in the extended position, whereby the rocker arm is in position 56, whereby the gate means 50 is open and the gate means 52 is closed. When said piston is retracted, the rocker arm rocks to the position 56' shown in phantom lines, thereby closing gate means 50 and opening gate means 52.

Situated at least partly in each of said chambers there is provided movable means adapted to be moved by the fabric on exhaustion of the respective pile. In the chamber 2, the movable means comprise a rocker member 58 connected to a moving arm 60; the rocker member 58 extends in the chamber to facilitate the correct formation of the pile 4. The said member 58 tends to occupy the lowermost position thereof by gravity and when the pile 4 is exhausted, the friction of the fabric 1 causes the member 58 to rock upwards, thereby moving the arm 60 which operates an electric switch means 62. The signal provided by said switch means is fed to panel 66 over a line 64. A solenoid valve 68 is operated from the panel 66 to actuate the mechanism 54, thereby reversing the airflow.

Likewise, in the outlet chamber 14, there is provided a rocker member 70 connected to a moving arm 72 which, when the member 70 is moved upwards, actuates a second electric switch means 74 connected to the panel 66 over a line 76. Each of the rocker members 58 and 70 is preferably provided with a counterweight 78 allowing the reaction sensitivity of the rocker member to the fabric friction on exhaustion of the respective pile to the adjusted.

The airflow is generated by the blower means 36, from which it reaches the space 48 through passages located at each side of the apparatus and which are not shown in the schematic longitudinal section of the figure. When the gate means 50 is open, the air flows through the branch 48 and enters the duct 28 through the slot means 40, transporting the fabric towards the outlet chamber 14. The air also flows into said chamber 14 which (like the inlet chamber 2) is partly limited by partitions 80 allowing the air to flow therethrough; said partitions may comprise perforated sheets, wirecloth or the like.

The air exiting from the chamber reaches an inner central space 82 where it is aspirated by the blower means, to reinitiate the cycle. The communication between said space 82 and the respective chambers 2 and 14 is controlled by second gate means 84 and 86, also controlled by the rocker arm 56 and respectively attached to the gate means 50 and 52; each pair of gate means 50, 84, and 52, 86 are in opposite positions. Filters 88 are inserted optionally in the air flow route.

In the operation of the apparatus, the fabric 1 is fed by hand in a fully flat state, over the rollers 8 and 10, the motor 12 being switched on for a period of time of about one minute to deposit a sufficient length of cloth in the bottom of chamber 2. Through appropriate side doors (not shown) the leading edge of the fabric is fed by hand to the height of the slot means 40 and when the blower means 36 is started (with gate means 50 open), the air flow transports the fabric to chamber 14, from where the fabric is fed by hand over the rollers 18 and 20 and through the mechanism 24.

A substantial amount of fabric is fed into the chamber 2 to form the pile 4 and by means of the blower means 36, the fabric is transported to form the outlet pile 16. On exhaustion of the pile 4, the air flow is automatically reversed and the fabric is transported again towards the inlet chamber, the movements being repeated as often as required. In the meantime, the motor 12 gradually supplies new untreated fabric and the motor 22 causes a gradual withdrawal of the treated fabric, the treatment of said fabric taking place continuously.

The nature of the treatment is determined by the adjustable speeds of the motors 12 and 22; by the fabric speed adjustable in terms of the blower driven air; by the adjustable temperature provided by the heating elements. Therefore, within a wide range of possibilities, there is attained a high degree of uniformity of surface treatment, high drying efficiency and a remarkable productivity and cheapening of costs.

In its movements through the duct 28, the fabric 1 is free from mechanical stresses and detrimental friction with the surfaces of the apparatus, since such movements are effected virtually without contact with the walls of the duct, due to the air being driven in one direction or another.

The following treatments may be obtained with the apparatus of the invention: cottons may be aged, creped, softened and shrunk; woollen fabrics may be felted, softened and dimensionally stabilised; all the types of finish corresponding to the different types of fibre may be obtained with blended fibre fabrics.

The apparatus described is fabricated basically in modular form, allowing one or several modules to be operated to obtain a more energetic operation as required by each fabric.

What is claim is:

1. An apparatus for the dry treatment of a fabric, comprising first and second chambers adapted to contain respective piles of open width fabric, said first chamber being for an inlet pile and said second chamber for an outlet pile; means for providing gradual supply of the fabric into said first chamber; means for providing a gradual removal of the fabric from said second chamber; a flattened section duct for containing the open width fabric and having ends which connect said first and second chambers; movable means situated at least partly in each chamber, adapted to be moved by the fabric on exhaustion of the respective pile; blower means for blowing air into said duct and transporting the fabric contained therein; heating elements disposed downstream of said blower means in the direction of said air to heat said air; slot means in each of the ends of said duct for allowing the ingress of air into the duct; gate means adapted to regulate alternately the direction of air flow towards one or the other slot means; drive means for said gate means, closing one of said gate means while opening the other of said gate means; and connecting means associating the movement of said movable means with said drive means so that upon the movable means sensing the exhaustion of a pile of fabric the drive means reverse the flow of air so as to reverse the direction of transport of the fabric.

2. The apparatus of claim 1, wherein said movable means comprise, for each chamber, a rocker member and a moving arm associated therewith.

3. The apparatus of claim 2, wherein said rocker member is provided with an adjustable counterweight allowing the reaction of said member to the action of the fabric on exhaustion of the pile to be adjusted.

4. The apparatus of claim 1, wherein said first and second chambers are partly limited by partitions allowing the passage of air therethrough.

5. The apparatus of claim 1, wherein said drive means comprise a cylinder and a piston mechanism and a rocker arm adapted to be rocked by said mechanism, said rocker arm having opposed portions, each of which is mechanically connected to different gate means.

6. The apparatus of claim 1, wherein said connection means comprise an electric switch means operable by each moving arm and a solenoid valve adapted to operate said mechanism.

7. The apparatus of claim 1, wherein said duct is arcuate, having two substantially vertically disposed end portions extending from said chambers and an upper central portion.

* * * * *